May 17, 1966 D. VON SANDEN 3,251,943

CIRCUIT ARRANGEMENT CONSTRUCTED IN THE MANNER OF A COUPLING MULTIPLE FOR THE CONNECTION OF TIME MULTIPLEX TELEPHONE SYSTEMS

Filed June 26, 1962 2 Sheets-Sheet 1

May 17, 1966 D. VON SANDEN 3,251,943

CIRCUIT ARRANGEMENT CONSTRUCTED IN THE MANNER OF A COUPLING MULTIPLE FOR THE CONNECTION OF TIME MULTIPLEX TELEPHONE SYSTEMS

Filed June 26, 1962 2 Sheets-Sheet 2

United States Patent Office 3,251,943
Patented May 17, 1966

3,251,943

CIRCUIT ARRANGEMENT CONSTRUCTED IN THE MANNER OF A COUPLING MULTIPLE FOR THE CONNECTION OF TIME MULTIPLEX TELEPHONE SYSTEMS

Dieter Von Sanden, Munich-Solln, Germany, assignor to Siemens & Halske Aktiengesellschaft, Berlin, Germany, a corporation of Germany Filed June 26, 1962, Ser. No. 205,402
Claims priority, application Germany, June 29, 1961, S 74,560
6 Claims. (Cl. 179—15)

Figure 1:
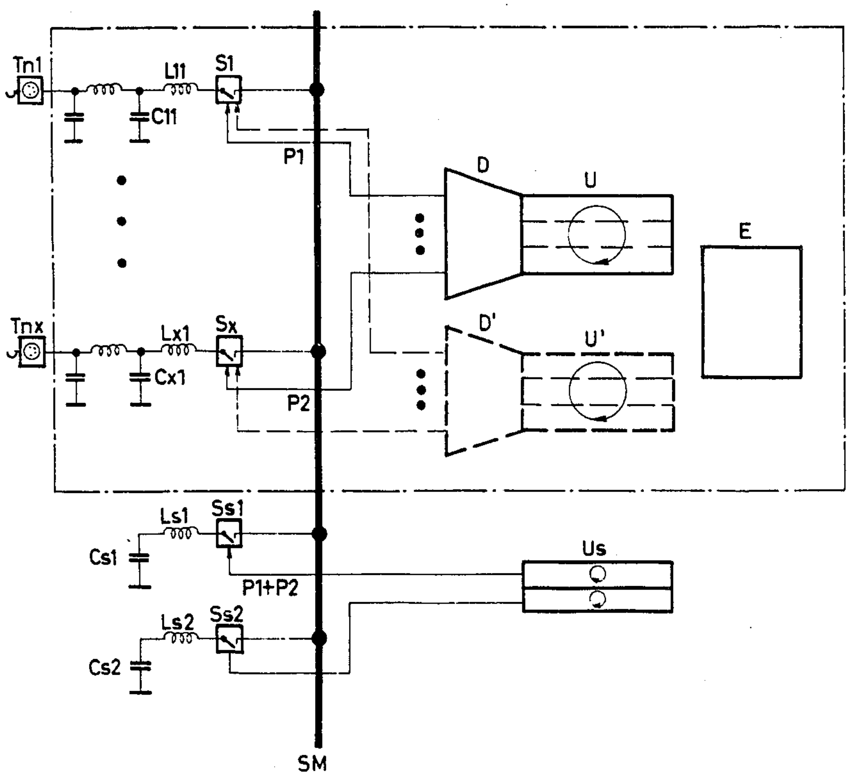

The invention disclosed herein is concerned with a circuit arrangement for time multiplex telephone systems. In such systems, messages which are being interchanged between given subscribers are modulated on impulse sequences which are mutually displaced, thus permitting multiple utilization of channels or connection paths. Time multiplex telephone systems may be in known manner differently constructed; those which are here of interest are systems having multiplex lines over which subscribers converse in connection with incoming as well as outgoing calls. As will be presently explained more in detail, such time multiplex telephone systems comprise devices arranged in definite manner for mutual cooperation.

There is for readily understandable reasons a desire to establish connections between subscriber stations of different such telephone systems. There may be involved spatially directly neighboring telephone systems. The number of subscriber stations that may be connected to a time multiplex telephone system has for sundry technical reasons an upper limit. In the event that there are a great many subscribers which are to be served, for example, ten thousand, it is necessary to provide instead of one single large capacity system, a plurality of smaller, spatially neighboring systems, or exchanges, which communicate with one another over particular circuit arrangements.

The present invention shows a way for constructing such a circuit arrangement in especially advantageous manner, resulting as a particular advantage in the possibility of effecting savings in the time multiplex telephone systems involved, without having to incur any particular expenditure.

There are already circuit arrangements known over which can be interconnected subscriber stations of a plurality of subscriber groups having respectively individual call or speech multiplex lines. See for example British Patent 822,297, especially FIG. 3 of such patent. The connections are in the corresponding system effected with the aid of energy storers, in which is temporarily stored the speech energy which is to be interchanged between subscribers involved in a given call. It must be considered in this connection, that subscribers involved in a call are generally at different instants connected to the call or speech multiplex lines of the respective subscriber groups. The speech energy storers are effective to bridge the time interval passing between the instants at which are actuated the call switches assigned to the respective subscribers, whereby the involved subscribers are impulse-wise connected to their respective call or speech multiplex lines. The corresponding call multiplex lines are synchronously likewise periodically impulse-wise interconnected with the aid of auxiliary switches. Accordingly, communication between subscribers of different subscriber groups is effected with the aid of such speech energy storers.

Assuming that there is a relative large number of such subscriber groups, it may be expected that the major part of calls will extend between such subscriber groups while fewer calls will be effected within the respective subscriber groups. Accordingly, a rather large number of such speech energy storers will have to be made available. It is understood, of course, that this also requires special devices for allocating these many speech energy storers in advantageous manner to the various calls.

The present invention proposes another mode of effecting connections between subscribers of different subscriber groups or different communication systems or exchanges, respectively. The circuit arrangement to be used thereby also facilitates the calls within the communication systems. A particular advantage which is obtained resides in that only a relatively small number of speech energy storers are required.

Accordingly, the invention proposes a circuit arrangement over which calls are effected between a plurality of time multiplex telephone systems, each of which has a call or speech multiplex line which is common to outgoing and incoming calls, and to which the subscribers of the corresponding system are impulse-wise periodically connected by means of call switches which are respectively individual to the corresponding subscriber stations. The characteristic feature of this circuit ararngement resides in that it is constructed in the manner of a coupling or cross wire field, having a coupling point contact for each combination comprising a pair of call multiplex lines, so as to effect over these coupling point contacts, by impulse-wise closure of coupling point contacts which are respectively connected to the involved call multiplex lines, calls between different time multiplex telephone systems, and also having coupling point contacts for each combination pair comprising a call multiplex line and a multiplex line of particular time multiplex systems which have speech energy storers instead of subscribers, and which are connectible to their respective multiplex lines twice per period, thereby enabling extension of calls within or internally of time multiplex telephone systems, so that only one call switch need be operatively actuated, at the same instant, in all these cases of operation, since the speech energy storers bridge in known manner, for the energy exchange between the corresponding subscribers, the time intervals between switching instants of the call switches assigned to the respective subscriber stations which are to be interconnected.

As noted above, the circuit arrangement according to the invention requires in each time multiplex telephone system at any instant, operative actuation of only one call switch. This applies to connections between different time multiplex telephone systems as well as to connections within or internally of the respective time multiplex telephone systems. This results in considerable simplification with respect to the control of the call switches and consequently in considerable savings in technical expenditures.

Details of the invention will appear from the description which is rendered below with reference to the accompanying drawings.

Figure 2:
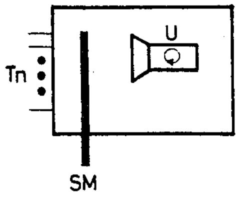
Figure 3:
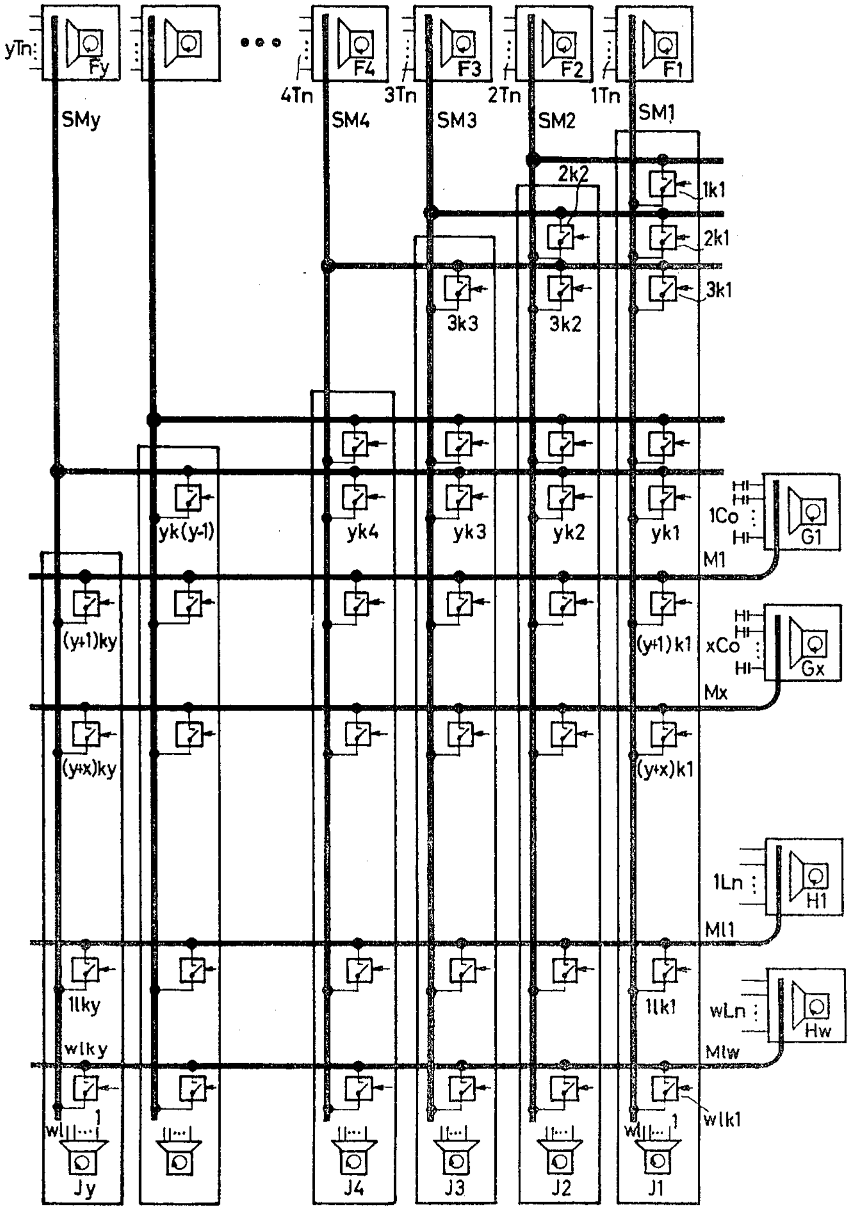

FIGS. 1 and 2 represent an example of a known time multiplex telephone system, showing only the devices thereof which are of importance for the understanding of the present invention; and FIG. 3 shows a circuit arrangement according to the present invention.

The example of a known time multiplex telephone system as shown in FIGS. 1 and 2 will be explained first in order to aid the understanding of the importance of the invention and of the advantages obtained thereby.

Referring now to FIG. 1, $Tn1$ . . . $Tnx$ are subscriber stations which can be connected with the call or speech multiplex line SM by means of the call switches S1 . . . $Sx$ which are respectively assigned to the subscriber stations. The call switches S1 . . . $Sx$ are controlled by control pulses which are supplied with the aid of cyclic storers. For example, there may be used two cyclic storers which are designated in FIG. 1 by U and U'. In the cycling storer U are cycled in coded form the numbers of subscribers engaged in outgoing calls and in the cycling storer U' are in corresponding manner cycled the numbers of subscribers engaged in incoming calls. The subscriber numbers which are present in coded form are hereinafter designated as addresses.

The addresses belonging to a given connection have the same cycling phase and therefore are simultaneously delivered at the outputs of the cyclic storers. To the outputs of the cyclic storers are connected the so-called triggering decoders D and D'. Each triggering decoder has as many outputs as there are subscribers, each of these outputs being assigned to a definite subscriber. Each call switch is connected to an output of the triggering decoder D and also to an output of the triggering decoder D'. Upon conducting the address of a subscriber to a triggering decoder, an impulse will be given off at the output thereof, which impulse is assigned to the corresponding subscriber. The impulse is utilized for the control of the call switch which is assigned to the corresponding subscriber. Simultaneous delivery of an impulse to outputs assigned to two different subscribers causes simultaneous closure of the call switches assigned to respective subscribers, and these subscribers will be interconnected over the call or speech multiplex line SM. This is repeated periodically with the cycling period of the address which are being cycled in the cyclic storers, thereby effecting the intended connection between the subscribers involved.

Further devices are provided in the corresponding communication system in addition to the above mentioned devices, especially devices for extending and for releasing calls. These devices are merely symbolically indicated by the rectangle E shown in FIG. 1.

Connections can also be established in such a system without using the cyclic storer U', provided that speech energy storers are, as already indicated, employed for bridging given time intervals. These speech energy storers are represented in FIG. 1 by the capacitors $Cs1$ and $Cs2$. These capacitors may cooperate with other capacitors such as C11 and $Cx1$, which are assigned to the respective subscribers and operate in effecting the exchange of speech energy. The capacitors $Cs1$ and $Cs2$ are likewise periodically impulse-wise connected to the speech or call multiplex line SM. This is accomplished by the operation of the cyclic storer $Us$ which is of considerably simpler structure as compared with the cyclic storers U and U', since it has to control considerably fewer switches.

When using a speech energy storer, a connection is maintained as follows:

In the cyclic storer U are periodically cycled, mutually displaced as to time, the addresses of the two subscribers which are to be interconnected, for example, the subscribers $Tn1$ and $Tnx$. Accordingly, the subscriber stations $Tn1$ and $Tnx$ with their capacitors C11 and $Cx1$ are at different instants periodically impulse-wise connected with the call multiplex line SM. In the cyclic storer $Us$ are in such case cycled, synchronously with the addresses of the two subscribers $Tn1$ and $Tnx$ which are being cycled in the storer U, two control commands for the actuation of the switch $Ss1$. Accordingly, the capacitor $Cs1$ is connected to the call multiplex line SM simultaneously with the connection of the capacitors C11 and $Cx1$. An exchange of the charges between the respective symultaneously connected capacitors is thereby with the cooperation of the coils $Ls1$, L11 and $Lx1$ effected in known manner (see for example, British Patent 822,297), such exchange of the charges entailing an exchange of speech energy between the subscribers involved in the call and resulting in the intended connection between these subscribers.

FIG. 2 is a simplified symbolic representation of the devices of the system shown in FIG. 1 within the dot-dash rectangle. The cyclic storer U' and the decoder D' which are shown in FIG. 1 in dash lines, are omitted in the symbol represented in FIG. 2. This symbol is used in FIG. 3, showing the circuit arrangement according to the invention, over which a plurality of time multiplex telephone systems can communicate.

The construction of this circuit arrangement, including also further devices employed therein, will now be explained more in detail.

As noted before, this circuit arrangement includes a coupler, having a definite number of contacts which will be referred to as coupling point contacts. The designation "coupler" therefore means the arrangement comprising these contacts. The coupler has first of all the coupling point contacts $1k1$, $2k1$, $2k2$, $3k1$, $3k2$, $3k3$ . . . $yk1$ . . . $yk(y-1)$. The coupling point contacts are respectively connected to two of the call multiplex lines SM1 . . . $SMy$ which are part of the time multiplex telephone systems F1 . . . $Fy$. To each combination pair of these call multiplex lines is assigned one coupling point contact. Thus, the coupling point contact $1k1$ is, for example, assigned to the call multiplex lines SM1 and SM2, while the coupling point contact $2k1$ is assigned to the call multiplex lines SM1 and SM3. Accordingly, the call multiplex lines can be interconnected in desired manner, in pairs. In FIG. 3, all these coupling point contacts are in positions so that the connections effected thereby can be readily recognized.

As mentioned above, the call multiplex lines SM1 . . . $SMy$ are respectively parts of the time multiplex systems F1 . . . $Fy$. To the respective time multiplex systems are connected groups of subscribers which are respectively indicated by $1Tn$ . . . $yTn$. Each time multiplex system, represented by the symbol shown in FIG. 2, comprises a cyclic storer for the addresses of subscribers. Accordingly, only one call switch is in the respective systems closed at any given instant, thus connecting to the associated call multiplex line only one subscriber station.

There are, in addition to the above enumerated coupling point contacts, further coupling point contacts, namely the coupling point contacts $(y+1)k1$ . . . $(y+1)ky$ . . . $(y+x)k1$ . . . $(y+x)ky$. The coupling point contacts are assigned to combination pairs of multiplex lines comprising respectively one of the call multiplex lines SM1 . . . $SMy$ and a multiplex line of a particular time multiplex communication system, these latter multiplex lines being the lines M1 . . . $Mx$ of the time multiplex communication system G1 . . . $Gx$. To these latter systems are connected speech energy storers instead of subscriber stations, such as speech energy storers being indicated in groups marked $1Co$ . . . $xCo$. Each of these time multiplex systems is likewise provided with a cyclic storer in which are cycled the addresses of speech energy storers. These speech energy storers are, with the aid of corresponding cyclic storers, periodically impulse-wise connectd to the associated multiplex lines, by means of switches, in a manner analogous to the connection of subscriber stations.

Calls between subscribers of different time multiplex telephone systems are effected over the coupling point contacts which are connected only to call multiplex lines, namely, the call multiplex lines SM1 . . . $SMy$. For example, a connection between a subscriber of the subscriber group $1Tn$ of the system F1, and a subscriber of the group of $yTn$ of the system of $Fy$, is effected as as follows:

In the communication system F1, the call switch of the involved subscriber is periodically impulse-wise closed, thereby connecting such subscriber periodically with the call multiplex line SM1. The control pulse which effects such operation has a definite phase position which differs from the phase positions of the control pulses assigned to other subscribers of the same telephone system. The coupling point contact $yk1$ is periodically impulse-wise closed in synchronism with the actuation of the call switch assigned to the subscriber 1T$n$. This results in impulse-wise connection effected between the call multiplex line SM1 and the call multiplex line SM$y$ to which is connected the other subscriber involved in the call which is being considered here. The desired telephone connection is effected by the cycling, in the cyclic storer of the time multiplex telephone system F$y$, of the address of the second subscriber, such that the resulting control pulse for the call switch assigned to the corresponding subscriber, has the same phase position as the control pulse which controls the actuation of the call switch assigned to the first subscriber. Accordingly, only one cyclic storer is required in each respective time multiplex telephone system, for maintaining the corresponding call.

It is of course understood that a plurality of telephone calls may be simultaneously maintained between two given time multiplex telephone systems. However, the control pulses assigned to the respective calls must have different phase positions. The corresponding calls may even extend over the identical coupling point contact without causing mutual interference. Subscribers involved in calls over other pairs of time multiplex telephone systems may likewise be simultaneously interconnected, since such interconnections will extend over other coupling point contacts. It is also possible to simultaneously maintain telephone calls with the aid of control pulses of the same phase position, provided that such calls extend over different pairs of call multiplex lines.

Calls between subscribers of one and the same time multiplex telephone system can likewise be effected with the aid of cyclic storers respectively provided therein. Such calls are effected over coupling point contacts $(y+1)k1 \ldots (y+x)ky$ with the aid of time multiplex systems G1 . . . G$x$, having speech energy storers instead of subscribers. Two control pulses with different phase positions are in such cases required for one and the same telephone call. For example, when two subscribers of the time multiplex telephone systems G1 converse with each other, the addresses of these two subscribers will be cycled mutually displaced in the respective cyclic storers. The call switches assigned to the respective subscribers are at different instants connected periodically imuplse-wise to the speech multiplex line SM1. In order to effect the desired connection, a coupling point contact, for example, the coupling point contact $(y+1)k1$ is at all these instants impulse-wise closed, thereby connecting the call multiplex line SM1 with the multiplex line M1 of the time multiplex system G1. The address of one and the same speech energy storer must in such case cycle twice in the cyclic storer of the time multiplex system G1, such that two control pulses are delivered for the closure of said coupling point contact, such pulses being of the same phase as the two control pulses delivered for the corresponding call in the time multiplex telephone system F1. The speech energy storer which is being used bridges in already described manner the time interval lying between two closures of the corresponding call switch in the time multiplex telephone system F1, thereby bringing about the desired connection between the two subscribers of this time multiplex telephone system.

Other pairs of subscribers of the same time multiplex telephone system F1 can converse with each other without interference, upon using other speech energy storers of the system G1, since other control pulses are necessarily utilized in such cases. Other pairs of subscribers connected to other time multiplex telephone systems can be additionally connected for conversation, upon utilizing other pairs of control pulses, even when using speech energy storers which are part of the system G1. Of course, these calls have to be extended over other coupling point contacts.

The circuit arrangement shown in FIG. 3 comprises further time multiplex communication systems with speech energy storers, such as the communication system G$x$. This makes it possible that subscribers to which are assigned call switches which are controlled by control pulses having the same phase position as the control pulses used for other calls, can converse with each other without trouble. However, these telephone connections are to be extended over other multiplex lines, so as to avoid mutual interference. This is however automatically accomplished inasmuch as the same pair of control pulses in one and the same time multiplex system with speech energy storers can be delivered only for one speech energy storer, since there is in such system only one cyclic storer.

The circuit arrangement which is according to the invention constructed for effecting calls between a plurality of time multiplex telephone systems, gives the possibility of building up connections of any desirable kind despite the fact that the respective systems are constructed in particularly simple manner. Mutual disturbances between calls are automatically avoided.

Means are also provided for effecting calls over lines leading to other exchanges. For this purpose are provided further coupling point contacts $1lk1 \ldots wlky$, over which the call multiplex lines SM1 . . . SM$y$ can be connected with multiplex lines M$l$1 . . . M$lw$. The time multiplex communication systems H1 . . . H$w$ have, instead of subscriber stations, lines 1L$w$ . . . $w$L$n$, extending to other exchanges, for effecting outgoing and incoming calls. Calls of this kind are effected, for example, by impulse-wise closure of coupling point contacts such as the contact $1lk1$. Thus, assuming that a subscriber connected to the time multiplex telephone system F1 is to be connected with a line in the line group 1L$n$, the call switch which is assigned to such subscriber will periodically actuated by control pulses, and the corresponding subscriber station will thereby be connected periodically impulse-wise, with the call multiplex line SM1. The coupling point contact $1lk1$ is likewise operatively actuated by control pulses having the same phase position, whereby the call multiplex line SM1 is connected with the multiplex line M$l$1. In addition, the switch in the communication system H1, which is assigned to the line leading to another exchange, is likewise operatively actuated by control pulses with the same phase position. These operations effect the desired connection. Each of the time multiplex systems H1 . . . H$w$ has only one cyclic storer, thus automatically preventing the undesired utilization of the same multiplex line for different telephone calls, with the use of control pulses of the identical phase position.

The manner of actuating the coupling point contacts will now be briefly explained. These contacts can be operatively actuated with the aid of means such as they are used for the actuation of the call switches etc. For example, cyclic storers may be provided in which the code signals are being cycled as addresses respectively assigned to the coupling point contacts, serving for the production of the required control pulses. These control pulses effect the periodic impulse-wise closure of the respective coupling point contacts. For example, a cyclic storer of this kind can be cooperatively associated with coupling point contacts connected to a call multiplex line. This is likewise indicated in FIG. 3, in which the devices J1 . . . J$y$ are in this manner associated with the coupling point contacts of the respective call multiplex lines SM1 . . . SM$y$, each such device including a cyclic storer with a decoder, and further not illustrated parts. The cyclic storer forming a part of the device J1 has exactly as many outputs as there are coupling point contacts connected to the call multiplex line SM1, these outputs being indicated at 1 . . . $wl$. The various coupling point contacts are in given cases operatively actuated over the respective outputs. Different coupling point contacts connected to the same call multiplex line are not simultaneously actuated since different telephone calls would otherwise be connected together. Accordingly, one cyclic storer will suffice for the actuation of coupling point contacts connected to a given call multiplex line. The cyclic storers forming respectively part of the devices J2 . . . Jy are in similar manner cooperatively associated with coupling point contacts connected with other call multiplex lines such as SM2 . . . SMy. Coupling point contacts which are connected with two call multiplex lines being operatively considered only once. It is also possible to control the coupling point contacts with the aid of cyclic storers, in other combinations of such contacts.

It may be mentioned in conclusion, that the coupling point contacts, which must operate with relatively high switching frequency, are advantageously realized by electronic contacts, such as they are also employed for the call switches and other switches in the various communication systems. Details concerning such electronic switches are described in the copending application Serial No. 108,330, filed May 8, 1961.

Changes may be made within the scope and spirit of the appended claims which define what is believed to be new and desired to have protected by Letters Patent.

I claim:

1. A circuit arrangement over which are conducted communications of a plurality of time multiplex telephone systems each of which comprises a call multiplex line which is common to outgoing and incoming calls, wherein the subscriber stations of each respective system, which are involved in calls, are by means of call switches respectively individual thereto, periodically impulse-wise connected to the corresponding call multiplex line, said circuit arrangement being constructed as a coupler which comprises a coupling point contact for operatively connecting each combination of a pair of call multiplex lines, so as to enable communication between the respective time multiplex telephone systems, by impulse-wise closure of respective coupling point contacts which are connected with given call multiplex lines involved in calls, a special multiplex system which has speech energy storers operatively connected thereto, said arrangement having further coupling point contacts for operatively connecting each combination of a pair of a call multiplex line and a multiplex line of said special system which has speech energy storers connected thereto the storers of which are operatively connectable twice per period with their respective multiplex line, so as to enable establishing communications internally within the respective time multiplex telephone systems, whereby only one call switch is operatively actuated in the respective systems in any given case of establishing communication, said speech energy storers being operative to bridge for the energy exchanged between communicating parties, the time interval elapsing between the instants of actuation of the call switch assigned to the subscriber stations which are to be interconnected.

2. A circuit arrangement according to claim 1, comprising still further coupling point contacts operatively connectable to respective combinations of pairs of multiplex lines including respectively a call multiplex line and another multiplex line for establishing connections with further time multiplex systems having lines connected thereto, leading to other exchanges, such lines being common to outgoing and incoming calls of such other exchange, given communications being established by impulse-wise closure of said still further coupling point contacts.

3. A circuit arrangement according to claim 2, comprising a single cyclic storer operatively connected in each respective communication system, each respective storer being operative to cycle code signals representing respectively addresses of switches which are to be impulse-wise actuated, constituting control commands for the operative actuation of the respective switches.

4. A circuit arrangement according to claim 1, comprising capacitors forming speech energy storers and coils operatively connected in each of said special systems, said capacitors cooperating with said coils for exchanging during the time of closure of the respective switches and coupling point contacts the stored energy for the speech energy which is respectively stored in further capacitors arranged for cooperation with the respective subscriber stations involved in calls.

5. A circuit arrangement according to claim 1, comprising in further combination, a cyclic storer, wherein coupling point contacts connected to the same call multiplex line are operatively actuatable by code signals serving as addresses and periodically cycled in said cyclic storer, coupling point contacts which are connected with two call multiplex lines being operatively considered only once.

6. A circuit arrangement according to claim 5, wherein different coupling point contacts which are connected to one and the same call multiplex line are not actuated simultaneously.

References Cited by the Examiner

UNITED STATES PATENTS

| | | | |
|---|---|---|---|
| 2,917,583 | 12/1959 | Burton et al. | 179—15 |
| 2,987,577 | 6/1961 | Faulkner | 179—15 |
| 3,049,593 | 8/1962 | Touraton et al. | 179—15 |
| 3,060,267 | 10/1962 | Feder | 179—15 |

FOREIGN PATENTS

| | | |
|---|---|---|
| 822,297 | 10/1959 | Great Britain. |

DAVID G. REDINBAUGH, *Primary Examiner.*

THOMAS G. KEOUGH, *Assistant Examiner.*